US012475079B1

(12) United States Patent
Francois et al.

(10) Patent No.: US 12,475,079 B1
(45) Date of Patent: Nov. 18, 2025

(54) BIDIRECTIONAL RING-BASED INTERCONNECTION NETWORKS HAVING A CROSS BAR FOR MULTIPROCESSORS

(71) Applicant: International Business Machines Corporation, Armonk, NY (US)

(72) Inventors: Avery Francois, East Schodack, NY (US); Kenneth Douglas Klapproth, Travis, TX (US); Anna Mozeshtam, Poughkeepsie, NY (US); Chunggeon Rhee, Poughkeepsie, NY (US); Ekaterina M. Ambroladze, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/785,094

(22) Filed: Jul. 26, 2024

(51) Int. Cl.
*G06F 15/80* (2006.01)

(52) U.S. Cl.
CPC ................................ *G06F 15/80* (2013.01)

(58) Field of Classification Search
None
See application file for complete search history.

(56) References Cited

U.S. PATENT DOCUMENTS

| | | | |
|---|---|---|---|
| 5,815,489 A * | 9/1998 | Takatori | H04Q 11/0478 398/55 |
| 6,065,077 A | 5/2000 | Fu | |
| 6,457,087 B1 | 9/2002 | Fu | |
| 11,016,766 B2 | 5/2021 | Ould-Ahmed-Vall | |
| 11,157,405 B2 | 10/2021 | Rustad et al. | |
| 11,803,471 B2 | 10/2023 | Hammarlund et al. | |
| 11,921,574 B2 | 3/2024 | Ould-Ahmed-Vall | |
| 2002/0057474 A1* | 5/2002 | Boroditsky | H04J 14/0249 398/59 |
| 2002/0106146 A1* | 8/2002 | Lauder | H04J 14/0213 385/24 |

(Continued)

FOREIGN PATENT DOCUMENTS

| | | | | |
|---|---|---|---|---|
| EP | 2288084 B1 * | 4/2014 | | H04L 49/101 |
| WO | WO-2005015944 A1 * | 2/2005 | | H04J 14/021 |

OTHER PUBLICATIONS

Enaya, Ahmad Ring-Based Single-Link Failure Recovery Simulation Analysis, 2023, Toronto Metropolitan Univeristy 49 pages., (Year: 2023).*

(Continued)

*Primary Examiner* — Eric Coleman
(74) *Attorney, Agent, or Firm* — CANTOR COLBURN LLP; Edward Wixted

(57) ABSTRACT

Embodiments include processing commands on multiprocessor chip having a plurality of nodes that are interconnected via a clockwise ring network and a counterclockwise ring network. Aspects include receiving, by a first ring station associated with a first node of the plurality of nodes, the command for execution and transmitting, by the first ring station via one or more of the clockwise ring network and the counterclockwise ring network, the command for execution. Aspects also include receiving, by a second ring station associated with a second node of the plurality of nodes, the command for execution, wherein the second ring station is connected to a third ring station associated with a third node of the plurality of nodes via a first cross bar of the one or more cross bars and transmitting, by the second ring station to the third ring station via the first cross bar, the command for execution.

20 Claims, 16 Drawing Sheets

(56) References Cited

U.S. PATENT DOCUMENTS

| | | | | |
|---|---|---|---|---|
| 2005/0031345 | A1* | 2/2005 | Sharma | H04J 14/0283 398/45 |
| 2015/0117267 | A1* | 4/2015 | Lih | H04L 45/06 370/258 |
| 2018/0227180 | A1* | 8/2018 | Rao | G06F 15/76 |
| 2021/0111826 | A1* | 4/2021 | Hand | H04J 14/0227 |
| 2023/0318979 | A1* | 10/2023 | Francois | H04L 45/122 370/223 |

OTHER PUBLICATIONS

Anonymous, "Method and System for Load Balanced Routing in Ring Topology", IP.com No. IPCOM000215116D, Feb. 20, 2012, 4 pages.

Anonymous, "Method for triggering across high-speed asynchronous links", IP.com No. IPCOM000146496D, Feb. 13, 2007, 5 pages.

Bourduas et al., "A Hybrid Ring/Mesh Interconnect for Network-on-Chip Using Hierarchical Rings for Global Routing", Proceedings of the First International Symposium on Networks-on-Chip (NOCS'07), 2007, 8 pages.

IBM, "Using Broadcast within a Publish/Subscribe Broker to Reduce the Number of Messages Uselessly Received", IP.com No. IPCOM000137431D, Jun. 20, 2006, 3 pages.

Marandi et al., "Ring Paxos: A High-Throughput Atomic Broadcast Protocol", 2010 IEEE/IFIP International Conference on Dependable Systems & Networks (DSN), 2010, 10 pages.

Strauss et al., "Flexible Snooping: Adaptive Forwarding and Filtering of Snoops in Embedded-Ring Multiprocessors", ACM SIGARCH Computer Architecture News, vol. 34, No. 2, 2006, 12 pages.

* cited by examiner

BIDIRECTIONAL RING-BASED INTERCONNECTION NETWORKS HAVING A CROSS BAR FOR MULTIPROCESSORS

BACKGROUND

The present invention generally relates to computer technology, and more specifically, to a bidirectional ring-based interconnection network having one or more cross bars for multiprocessors.

Modern multiprocessors include a plurality of nodes, which include processing cores and caches, that are connected using an interconnection network to convey commands and responses between the plurality of nodes. Interconnection networks can be categorized according to their topology, routing strategy, and switching technique. The network topology, the way in which the components are interconnected, is a major determining factor in the overhead cost of message passing. Accordingly, network designs attempt to minimize both the number of messages required and the distances over which they must travel.

SUMMARY

Embodiments of the present invention are directed to processing a command on multiprocessor chip having a plurality of nodes that are interconnected via a clockwise ring network, a counterclockwise ring network, and one or more cross bars. A non-limiting example of the computer-implemented method includes receiving, by a first ring station associated with a first node of the plurality of nodes, the command for execution and transmitting, by the first ring station via one or more of the clockwise ring network and the counterclockwise ring network, the command for execution. The method also includes receiving, by a second ring station associated with a second node of the plurality of nodes, the command for execution, wherein the second ring station is connected to a third ring station associated with a third node of the plurality of nodes via a first cross bar of the one or more cross bars, transmitting, by the second ring station to the third ring station via the first cross bar, the command for execution, and transmitting the command for execution, by the second ring station to a fourth ring station associated with a fourth node of the plurality of nodes, wherein the fourth ring station is directly connected to the second ring station via one of the clockwise ring network and the counterclockwise ring network.

Embodiments of the present invention are directed to a multiprocessor chip having a plurality of nodes and a plurality of ring stations, which are each associated with one of the plurality of node, that are interconnected via a clockwise ring network, a counterclockwise ring network, and one or more cross bars. A first ring station associated with a first node of the plurality of nodes is configured to receive a command for execution and transmit, via one or more of the clockwise ring network and the counterclockwise ring network, the command for execution. A second ring station associated with a second node of the plurality of nodes is configured to receive the command for execution via the one or more of the clockwise ring network and the counterclockwise ring network, transmit the command for execution to a third ring station associated with a third node of the plurality of nodes via a first cross bar of the one or more cross bars, wherein the first cross bar connects the third ring station to the second ring station and transmit the command for execution, to a fourth ring station associated with a fourth node of the plurality of nodes, wherein the fourth ring station is directly connected to the second ring station via one of the clockwise ring network and the counterclockwise ring network.

Embodiments of the present invention are directed to a system having a memory having computer readable instructions and a multiprocessor chip for executing the computer readable instructions. The multiprocessor chip includes a plurality of nodes and a plurality of ring stations, which are each associated with one of the plurality of node, that are interconnected via a clockwise ring network, a counterclockwise ring network, and one or more cross bars. A first ring station associated with a first node of the plurality of nodes is configured to receive a command for execution and transmit, via one or more of the clockwise ring network and the counterclockwise ring network, the command for execution. A second ring station associated with a second node of the plurality of nodes is configured to receive the command for execution via the one or more of the clockwise ring network and the counterclockwise ring network, transmit the command for execution to a third ring station associated with a third node of the plurality of nodes via a first cross bar of the one or more cross bars, wherein the first cross bar connects the third ring station to the second ring station and transmit the command for execution, to a fourth ring station associated with a fourth node of the plurality of nodes, wherein the fourth ring station is directly connected to the second ring station via one of the clockwise ring network and the counterclockwise ring network.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
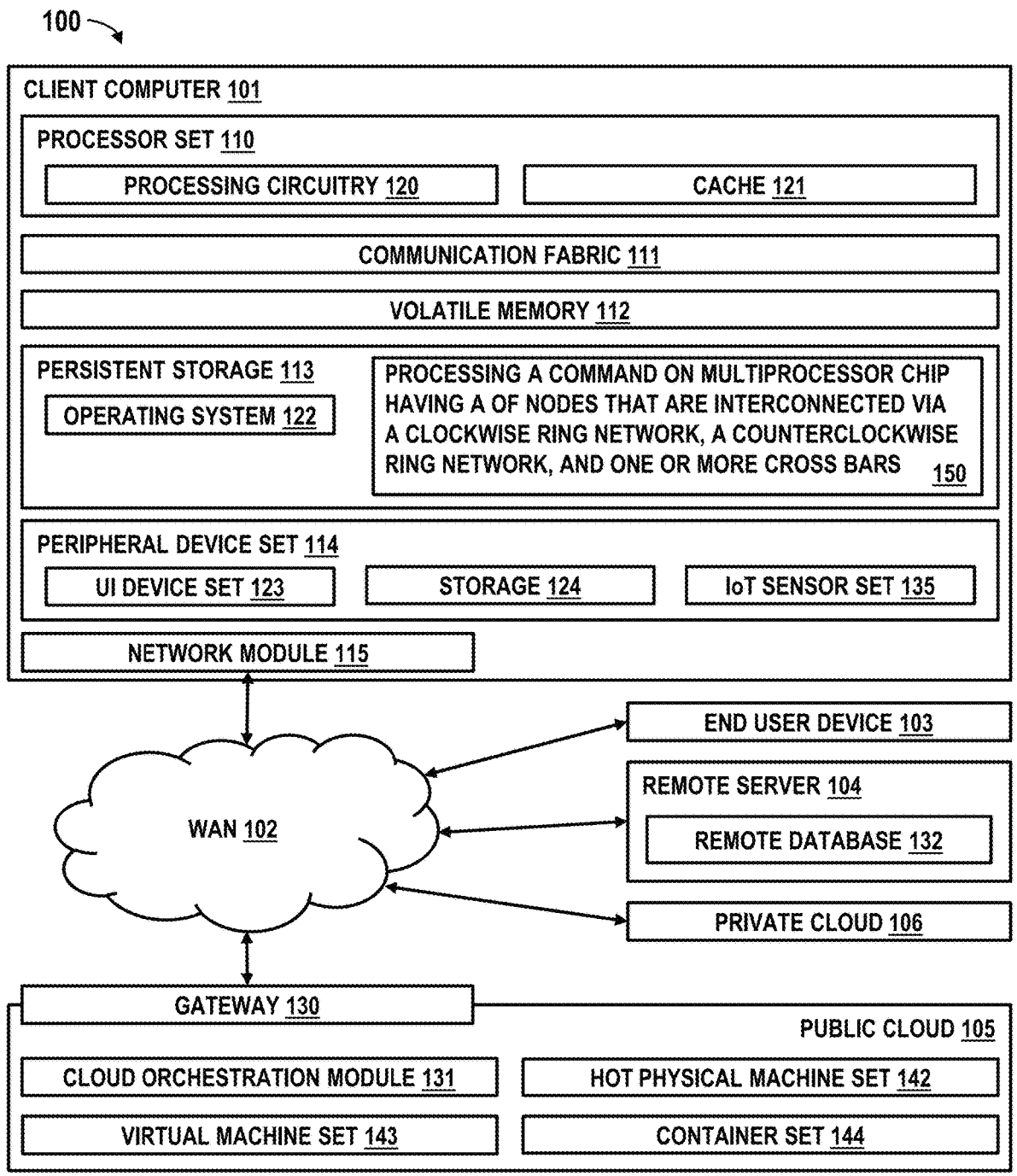
FIG. 1 depicts a block diagram of an example computer system for use in conjunction with one or more embodiments of the present disclosure.

One or more embodiments of the invention are configured to process commands on a multiprocessor chip having a plurality of nodes that are interconnected via bidirectional networks, i.e., a clockwise ring network and a counterclockwise ring network and via one or more cross bars. In exemplary embodiments, a determination of a manner in which a command will be executed via the bidirectional networks is based on the type of the command and upon congestion of the bidirectional networks. In exemplary embodiments, the manner in which a command will be executed via the bidirectional networks includes whether the command will be executed in a unidirectional or bidirectional manner and whether the command will be rebroadcast via nodes that receive the command via a cross bar.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as processing a command on multiprocessor chip having a of nodes that are interconnected via a clockwise ring network, a counterclockwise ring network, and one or more cross bars, as shown at block 150. In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 131 manages the transfer and storage of images, deploys new instantiations of VCEs and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

Figure 2A:
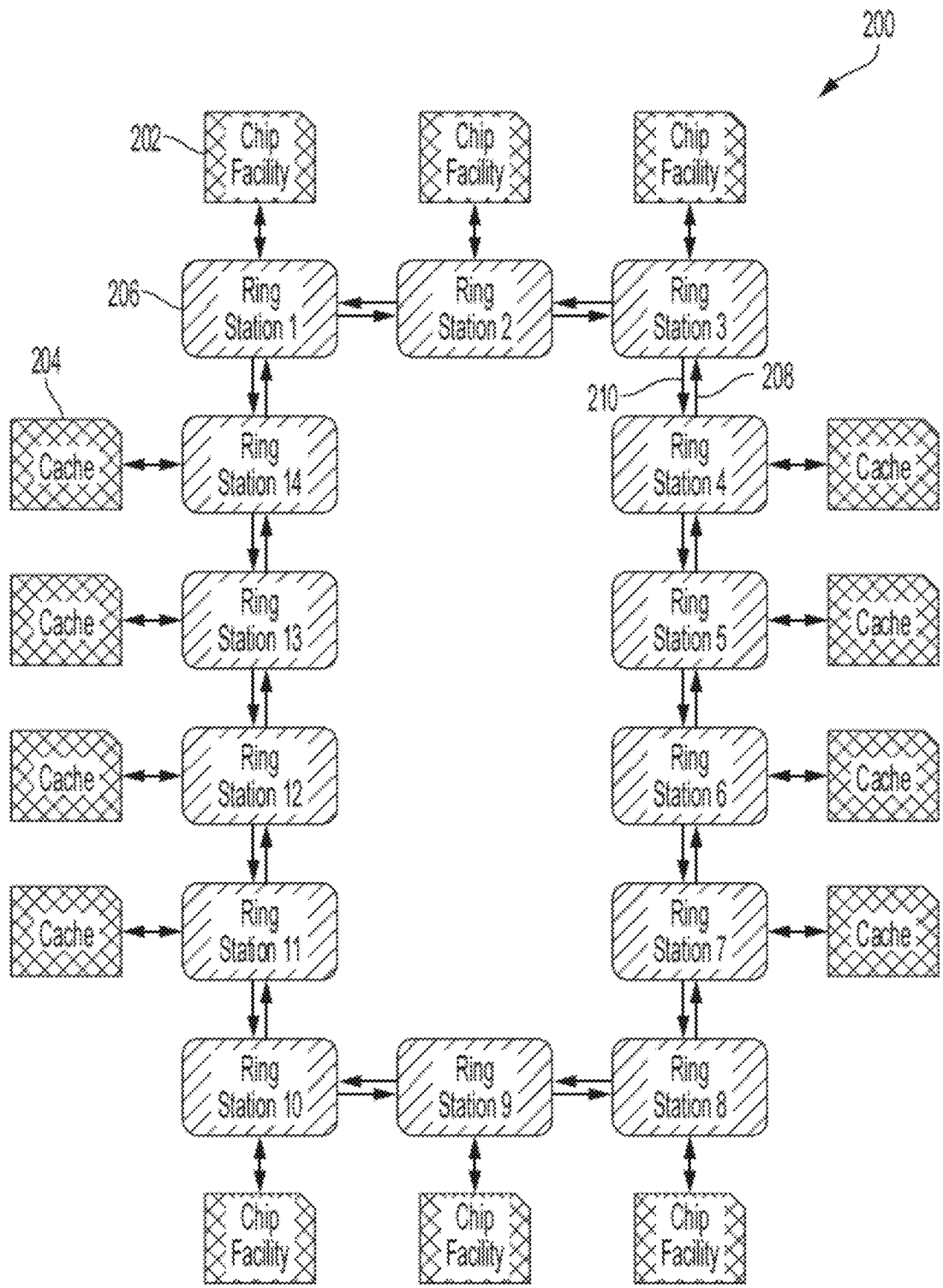
FIG. 2A is a block diagram of a multiprocessor having bidirectional ring-based networks in accordance with one or more embodiments of the present invention.
Figure 2B:
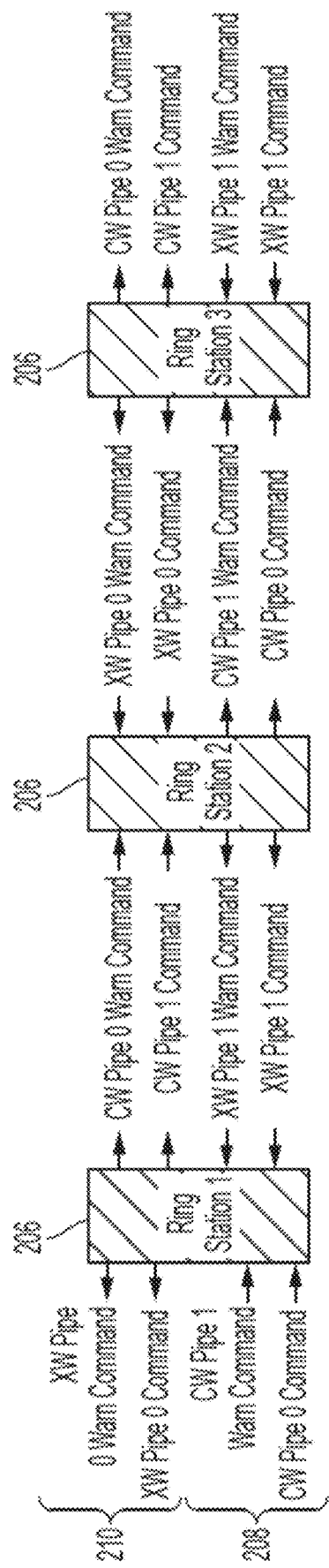
FIG. 2B is a block diagram illustrating a portion of the bidirectional ring-based networks in accordance with one or more embodiments of the present invention.

Referring now to FIGS. 2A and 2, block diagrams of a multiprocessor 200 in accordance with one or more embodiments of the present invention are shown. The multiprocessor 200 shown in FIGS. 2A and 2B may be used in and/or integrated into computer 101, shown in FIG. 1. As illustrated, the multiprocessor 200 includes a plurality of ring stations 206 that are each associated with a node in the multiprocessor 200. The nodes include chip facilities, or processing cores, 202 and shared memories, or caches 204.

Each of the ring stations 206 is connected to the two adjacent ring stations 206 via one of a clockwise ring network 210 and a counterclockwise ring network 208. Each ring station 206 is configured to send and receive messages to and from each adjacent ring station 206.

In exemplary embodiments, each ring station 206 is configured to be able to place a command, such as a snoop request, onto one or more of the clockwise ring network 210 and the counterclockwise ring network 208. In exemplary embodiments, once a snoop request has been entered into a ring network it will not be halted as it flows around the ring network. Accordingly, in order to determine when commands can and can't be placed onto the ring network during a particular cycle, a warning signal is transmitted on the ring by a ring station in advance of primary ring traffic. The warning signal is an indication that is transmitted ahead of the primary ring traffic that is used by ring stations to identify what will be transmitted on the ring network in future cycles. The time that the warning signal is received time by a ring station can be used as the singular arbitration point determining when to initiate a command onto the ring network. In exemplary embodiments, all future messages relating to a command are reserved in time behind the warning signal.

As best shown by FIG. 2B, the clockwise ring network 210 and counterclockwise ring network 208 connecting each ring station 206 can be partitioned further based upon an address bit delimitation, referred to as a "pipe", in order to increase throughput. In one embodiment, ring traffic in each direction time multiplexes these pipes and alternates between them in each direction. The pipes in each ring direction are offset such that no ring station 206 will receive a command on the same pipe in both directions to avoid queueing to the ring station 206. As described in more detail below, in some embodiments, the multiprocessor 200 includes an even number of ring stations to avoid queueing to the ring station 206 and collisions, where two commands are delivered to a single ring station during a single cycle for a same pipe.

Figure 3A:
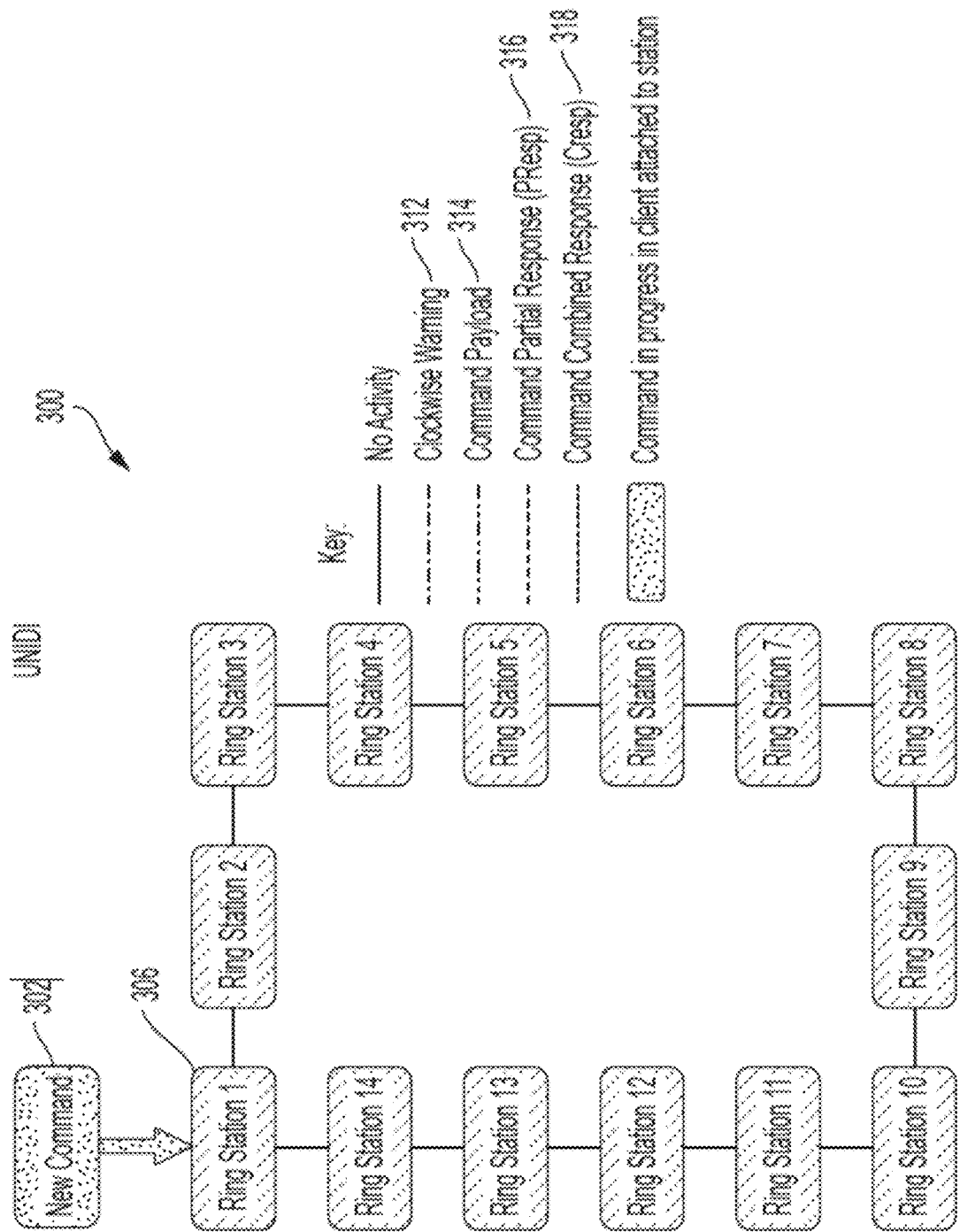
FIGS. 3A, 3B, 3C, 3D, 3E, 3F, 3G, and 3H are block diagrams illustrating a flow of command and response signals through a ring-based network in accordance with one or more embodiments of the present invention.
Figure 3B:
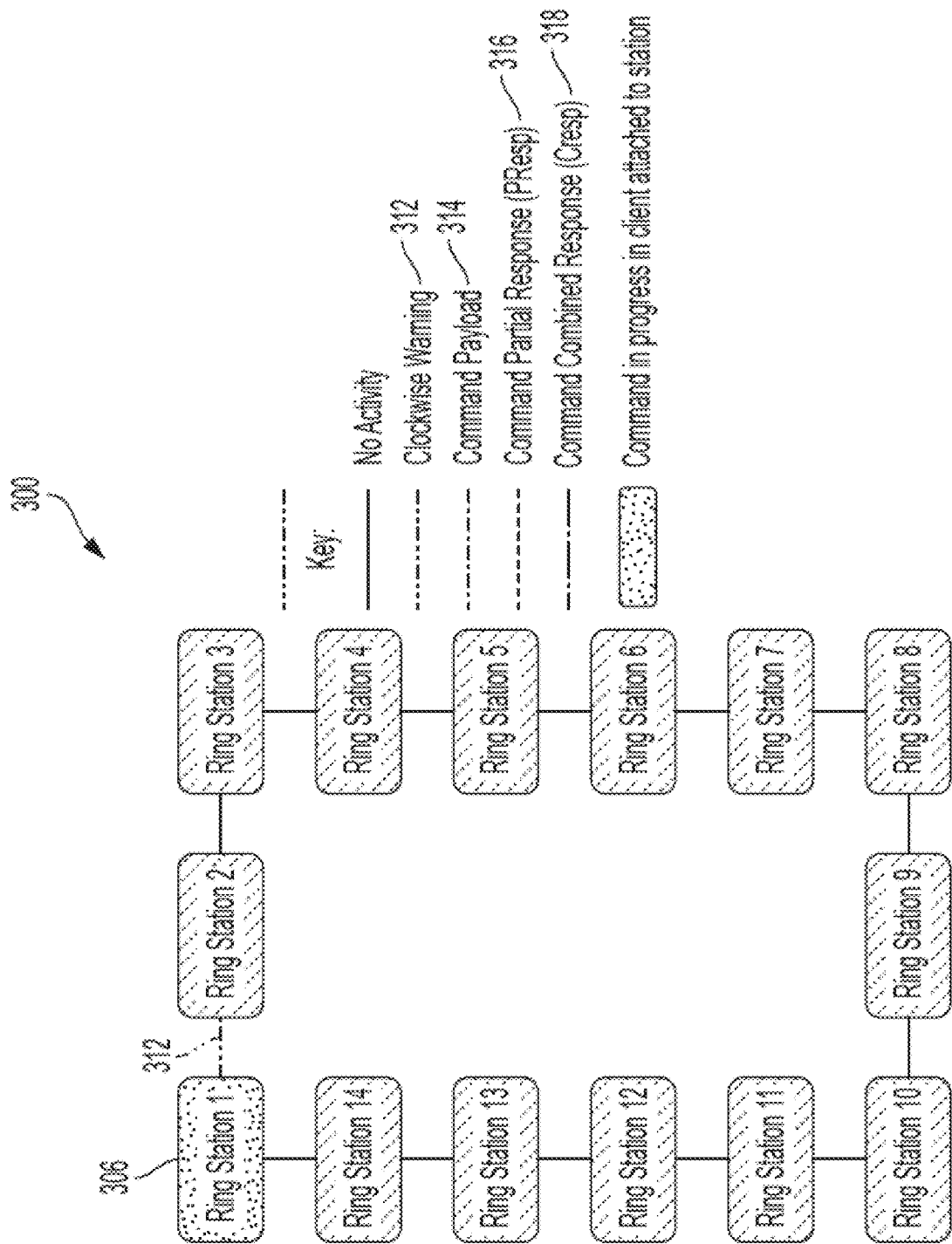

Referring now to FIGS. 3A, 3B, 3C, 3D, 3F, 3G, and 3H block diagrams illustrating a flow of command and response signals through a unidirectional ring-based network in accordance with one or more embodiments of the present invention are shown. As shown in FIG. 3A, a first node 302 of a multiprocessor associated with a first ring station 306 initiates a request for the first ring station 306 to place a command onto a unidirectional ring-based network 300. Next, as shown in FIG. 3B, once the first ring station 306 determines that the unidirectional ring-based network 300 is available for transmission of the command, the first ring station 306 transmits a warning signal 312 to the adjacent ring station. In exemplary embodiments, the determination that the unidirectional ring-based network 300 is available for transmission of the command is based on data extracted by the first ring station 306 from previously received warning signals indicating the traffic on the unidirectional ring-based network 300. In exemplary embodiments, one cycle after the first ring station 306 transmits the warning signal 312, the first ring station 306 transmits a command signal 314 on the unidirectional ring-based network 300.

Figure 3C:
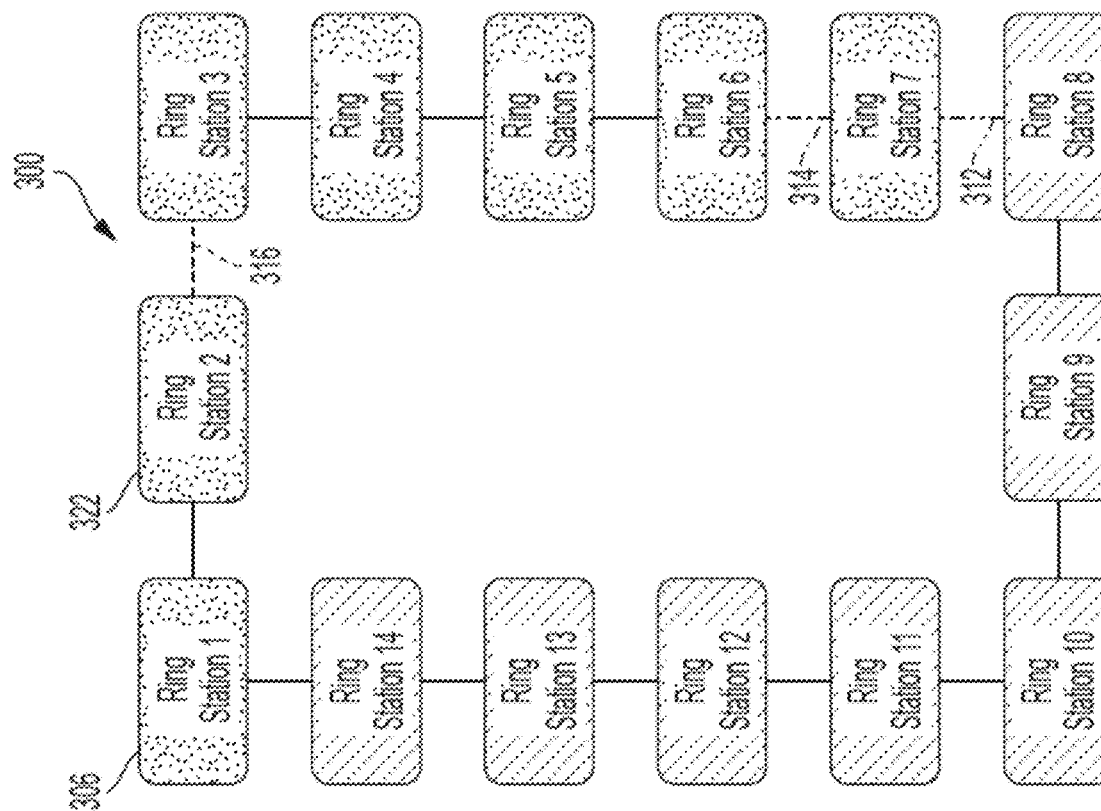
Figure 3D:
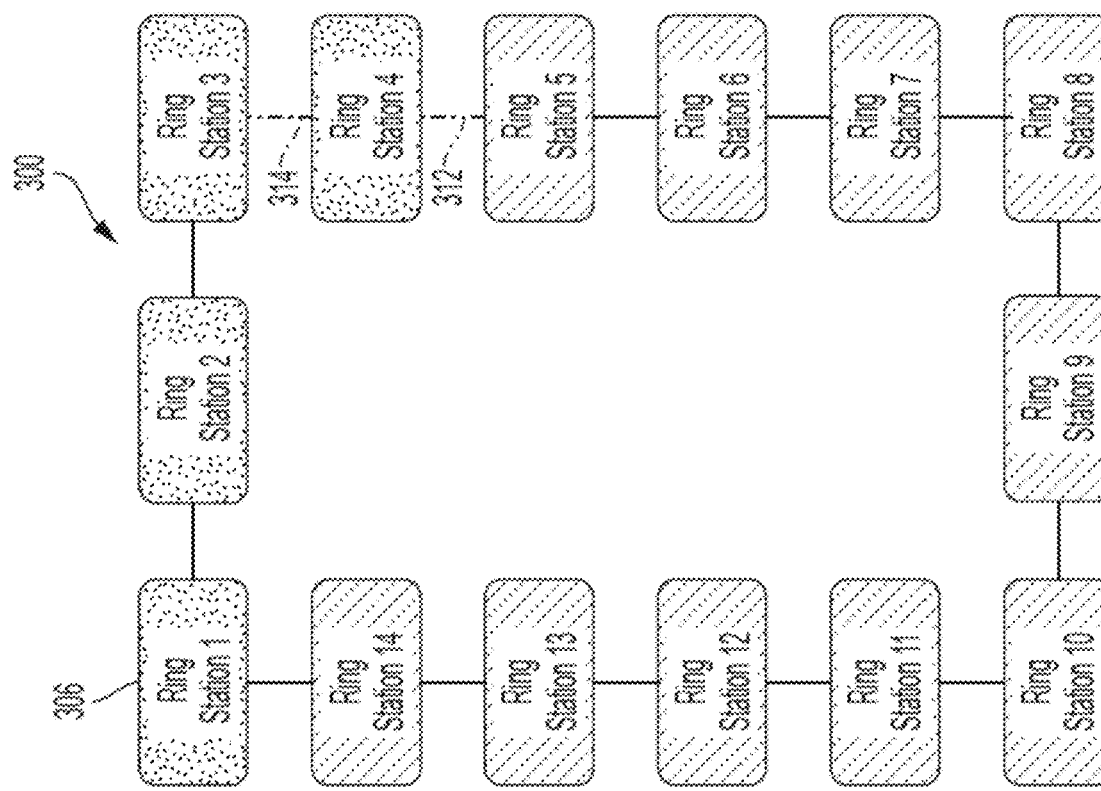

As shown in FIG. 3C, the warning signal 312 and the command signal 314 propagate around the unidirectional ring-based network 300 with each ring station transmitting the warning signal 312 and the command signal 314 to the next ring station. After receiving the command signal, each ring station will process the command and determine its response to the command. As shown in FIG. 3D, the second ring station 322 transmits a partial response signal 316 to the command to the next ring station a number of cycles after the command signal 314. In exemplary embodiments, each ring station is configured to receive a partial response signal 316 from an adjacent ring station, add its response to the partial response signal and transmit an accumulated partial response signal 316 to the next ring station. As shown in FIGS. 3D and 3E, the partial response signal 316 propagates around the unidirectional ring-based network 300 a number of cycles behind the command signal 314.

Figure 3F:
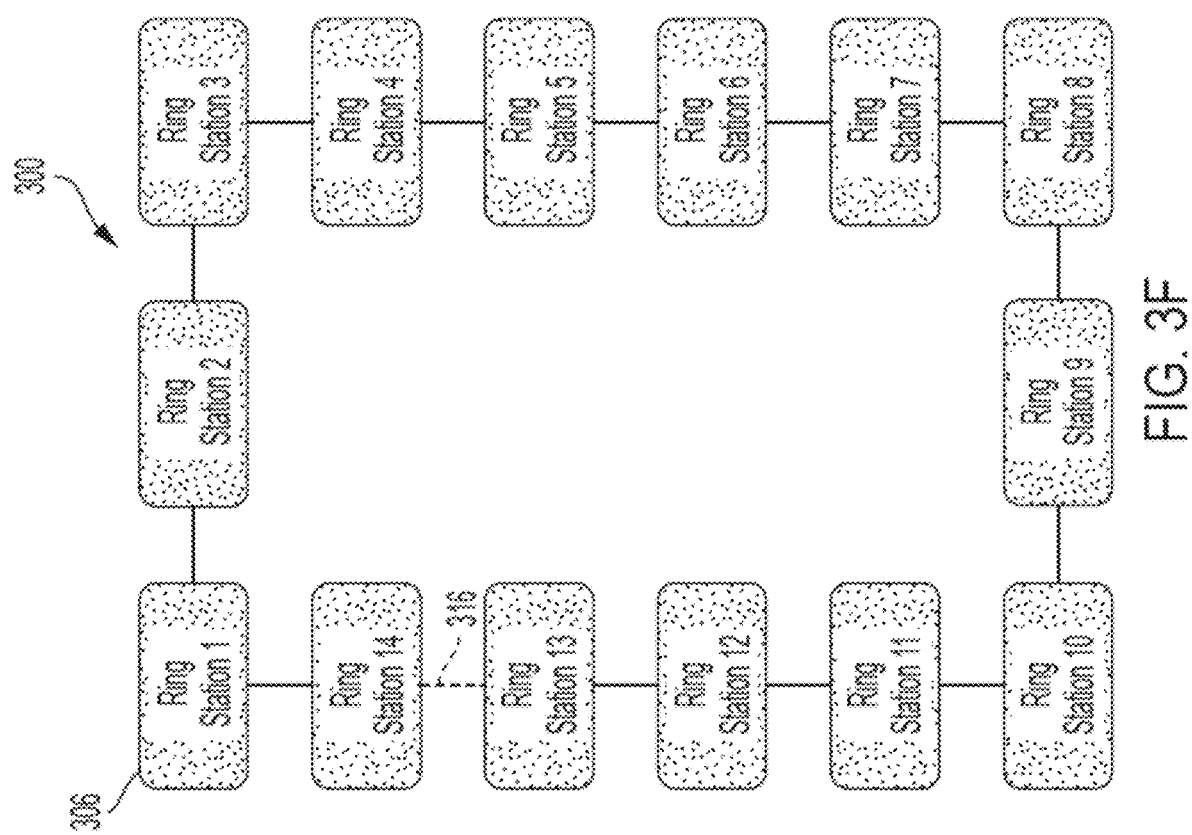
Figure 3E:
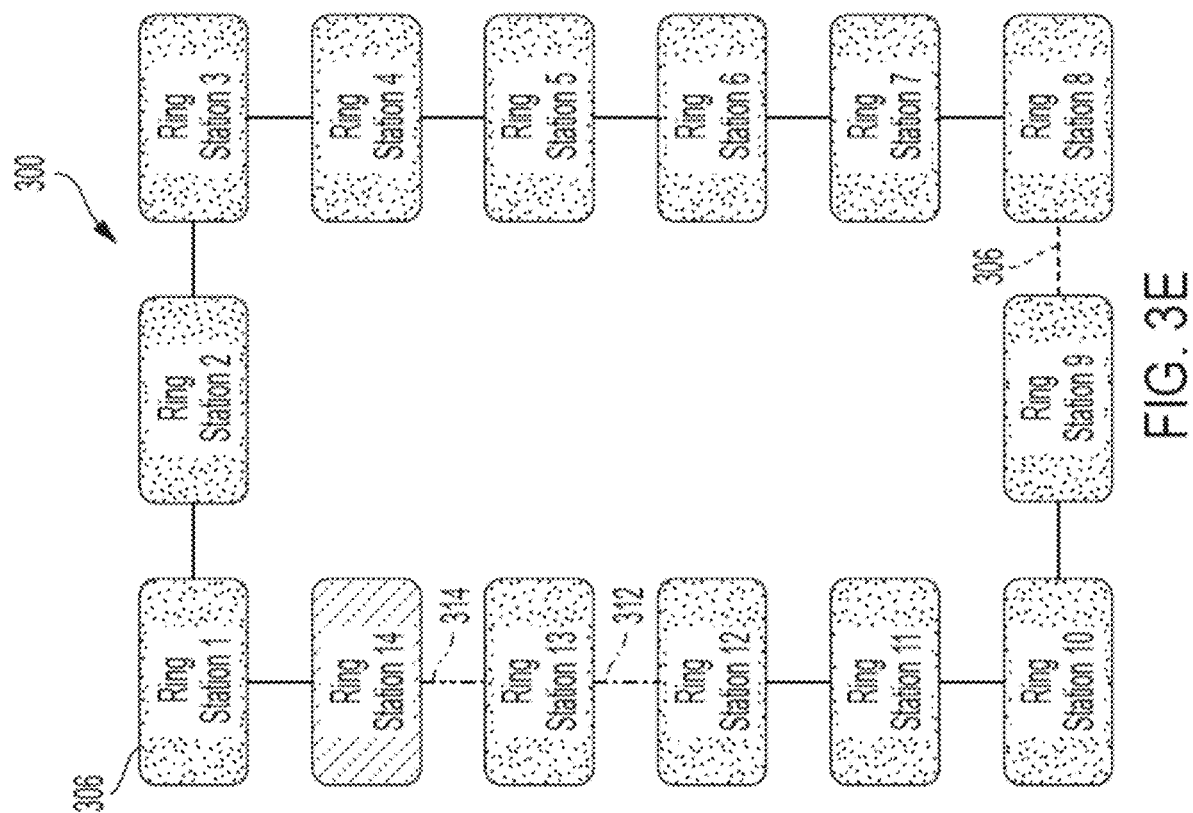
Figure 3H:
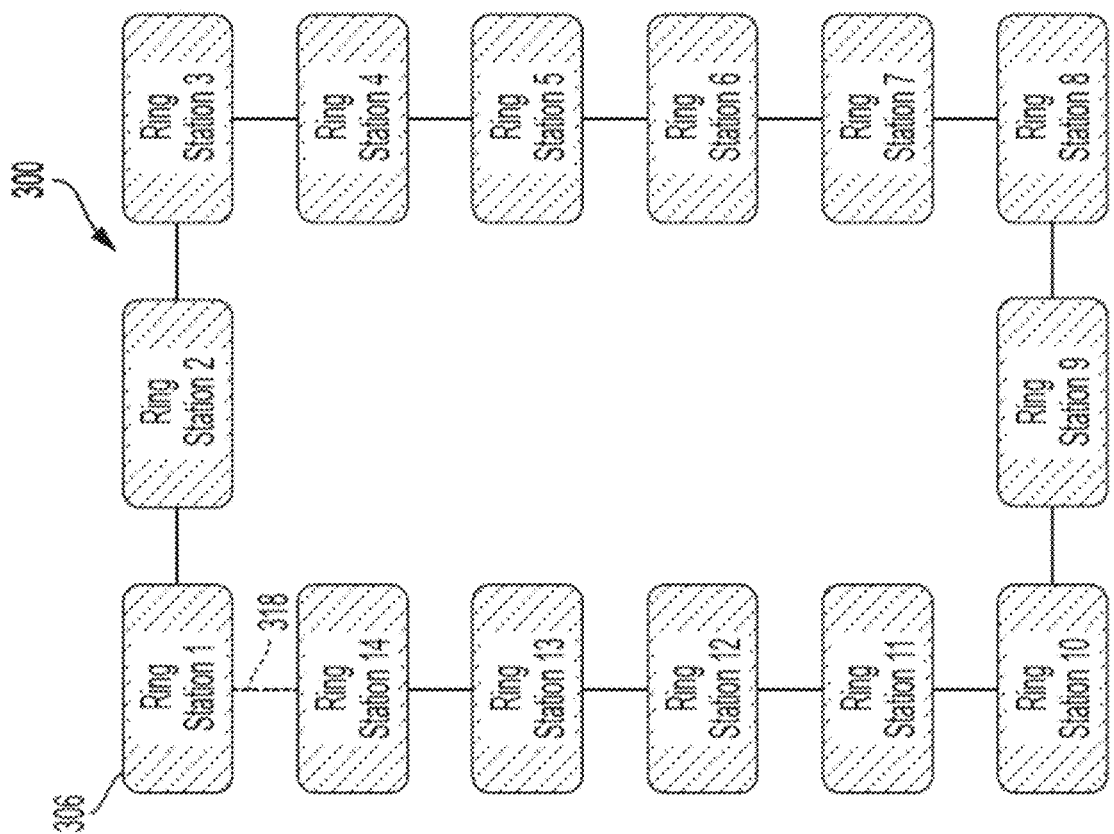
Figure 3G:
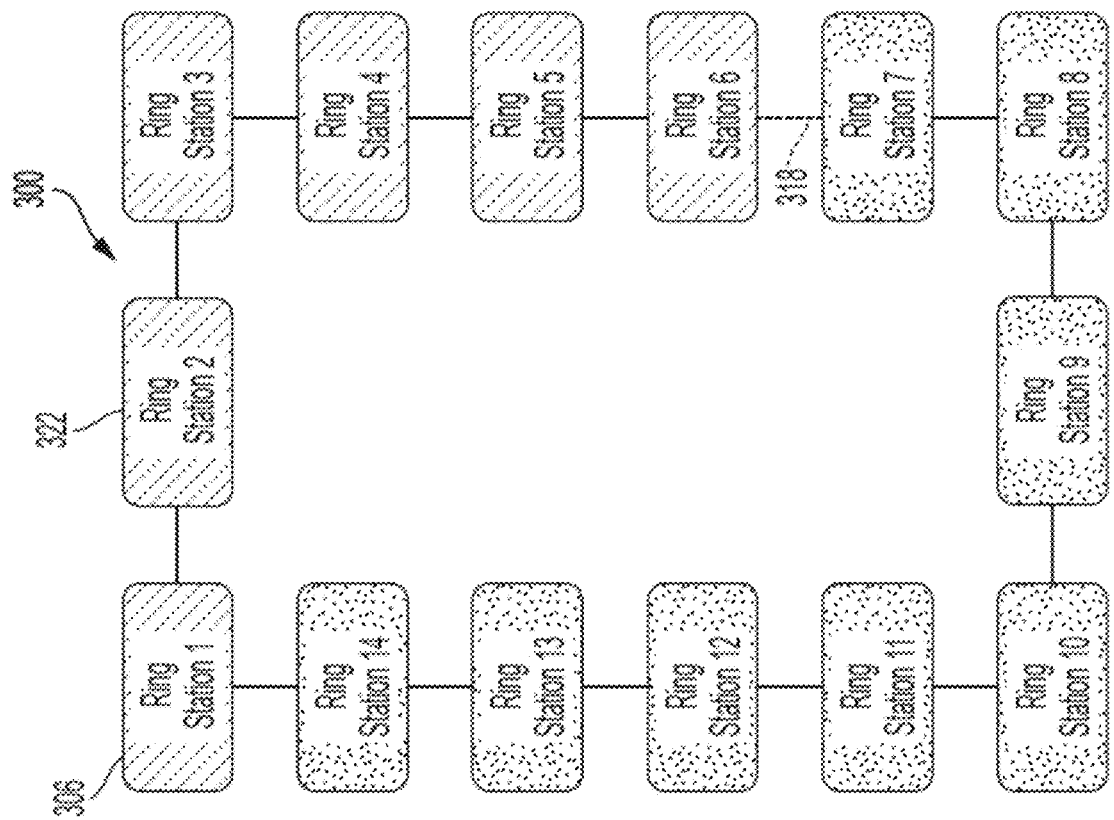

Next, as shown in FIG. 3F, the warning signal 312 and the command signal 314 terminate the traversal of the unidirectional ring-based network 300 upon reaching the first ring station 306 while the partial response signal 316 continues to propagate around the unidirectional ring-based network 300. After the partial response signal 316 reaches the first ring station 306, the first ring station 306 transmits a complete response signal 318 to the second ring station 322. As shown in FIGS. 3G and 3H, the complete response signal 318 traverses the unidirectional ring-based network 300 until it reaches the first ring station 306. When a ring station transmits or terminates the complete response signal 318, the ring station has completed its execution of the command.

Figure 4A:
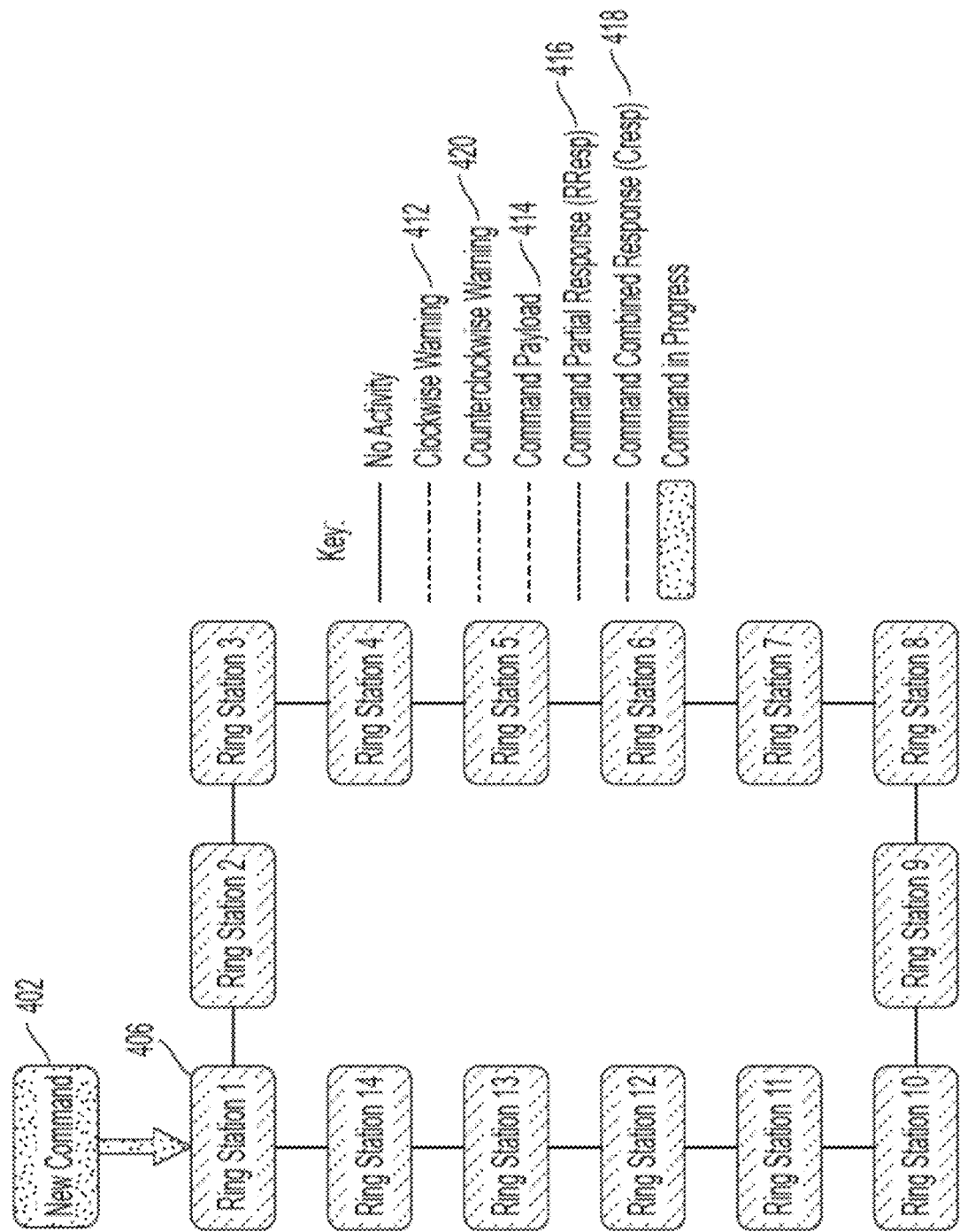
FIGS. 4A, 4B, 4C, 4D, 4E, 4F, 4G, 4H, 4I, and 4J are block diagrams illustrating a flow of command and response signals through ring-based networks in accordance with one or more embodiments of the present invention.
Figure 4C:
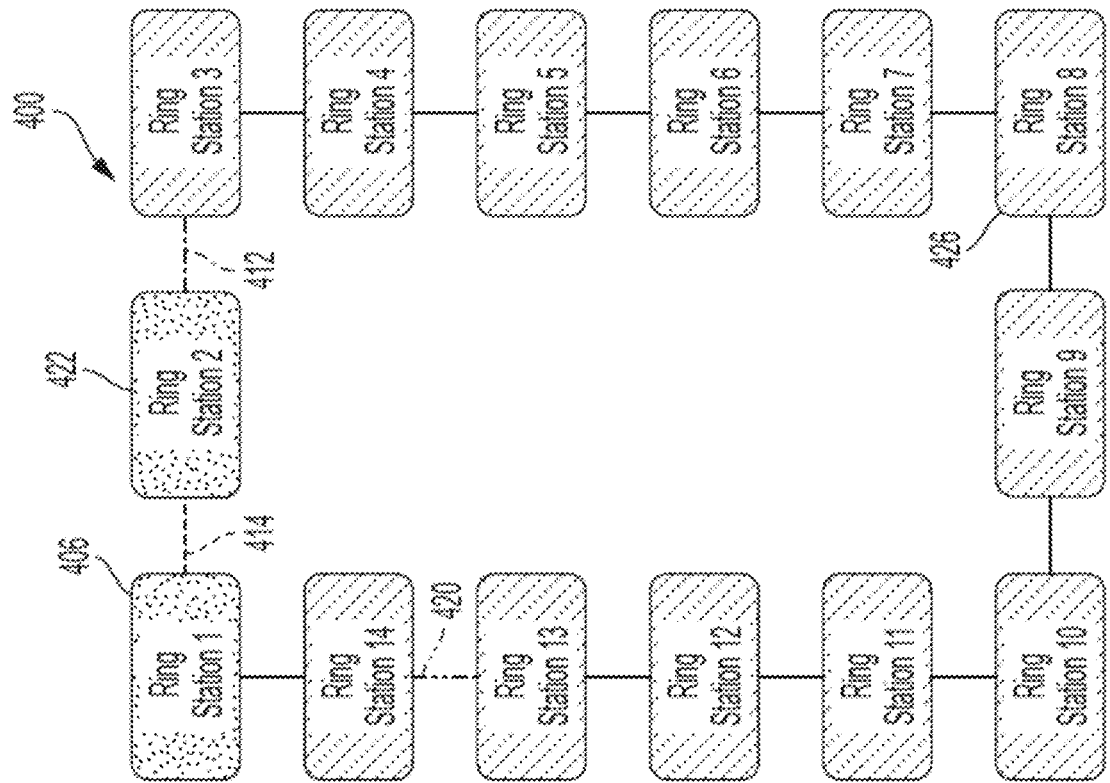
Figure 4B:
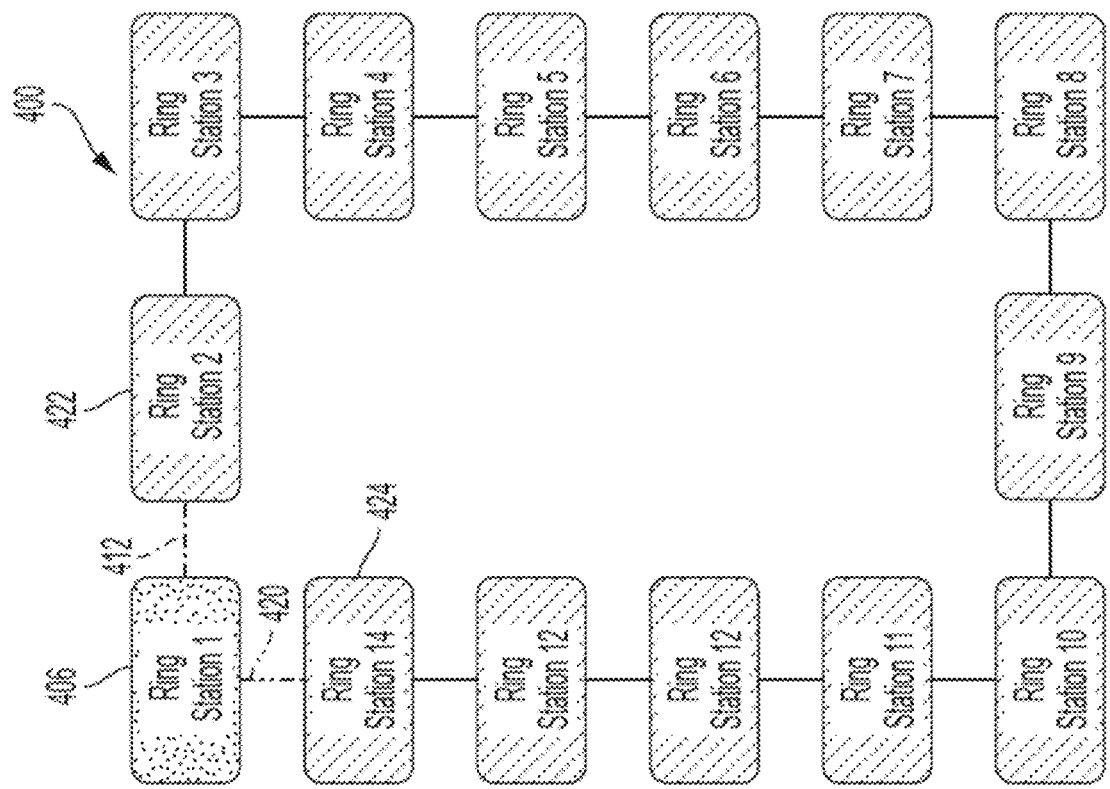

Referring now to FIGS. 4A, 4B, 4C, 4D, 4F, 4G, 4H, 4I, and 4J block diagrams illustrating a flow of command and response signals through bidirectional ring-based networks in accordance with one or more embodiments of the present invention are shown. As shown in FIG. 4A, a first node 402 of a multiprocessor associated with a first ring station 406 initiates a request for the first ring station 406 to place a command onto a bidirectional ring-based network 400. Next, as shown in FIG. 4B, once the first ring station 406 determines that the bidirectional ring-based network 400 is available for transmission of the command, the first ring station 406 transmits a clockwise warning signal, also referred to as a first warning signal, 412 to ring station 422 and a counterclockwise warning signal, also referred to as a second warning signal, 420 to ring station 424. The clockwise warning signal 412 and the counterclockwise warning signal 420 are transmitted by the first ring station 406 during the same clock cycle.

In exemplary embodiments, the determination that the bidirectional ring-based network 400 is available for transmission of the command is based on data extracted by the first ring station 406 from previously received warning signals indicating the traffic on the bidirectional ring-based network 400. In exemplary embodiments, the availability of the bidirectional ring-based network 400 is determined based on previously executed unidirectional and bidirectional commands being executed on the bidirectional ring-based network 400.

Next, as shown in FIG. 4C, in the cycle after the clockwise warning signal 412 is transmitted, the first ring station 406 transmits a command signal 414 to the ring station 422. The clockwise warning signal 412 and the command signal 414 propagate around the bidirectional ring-based network 400 in the clockwise direction with each ring station transmitting the clockwise warning signal 412 and the command signal 414 to the next ring station until the diagonal ring station 426 is reached. The diagonal ring station 426 is the ring station that is the same number of hops away from the first ring station 406 in both the clockwise and counterclockwise directions.

Figure 4E:
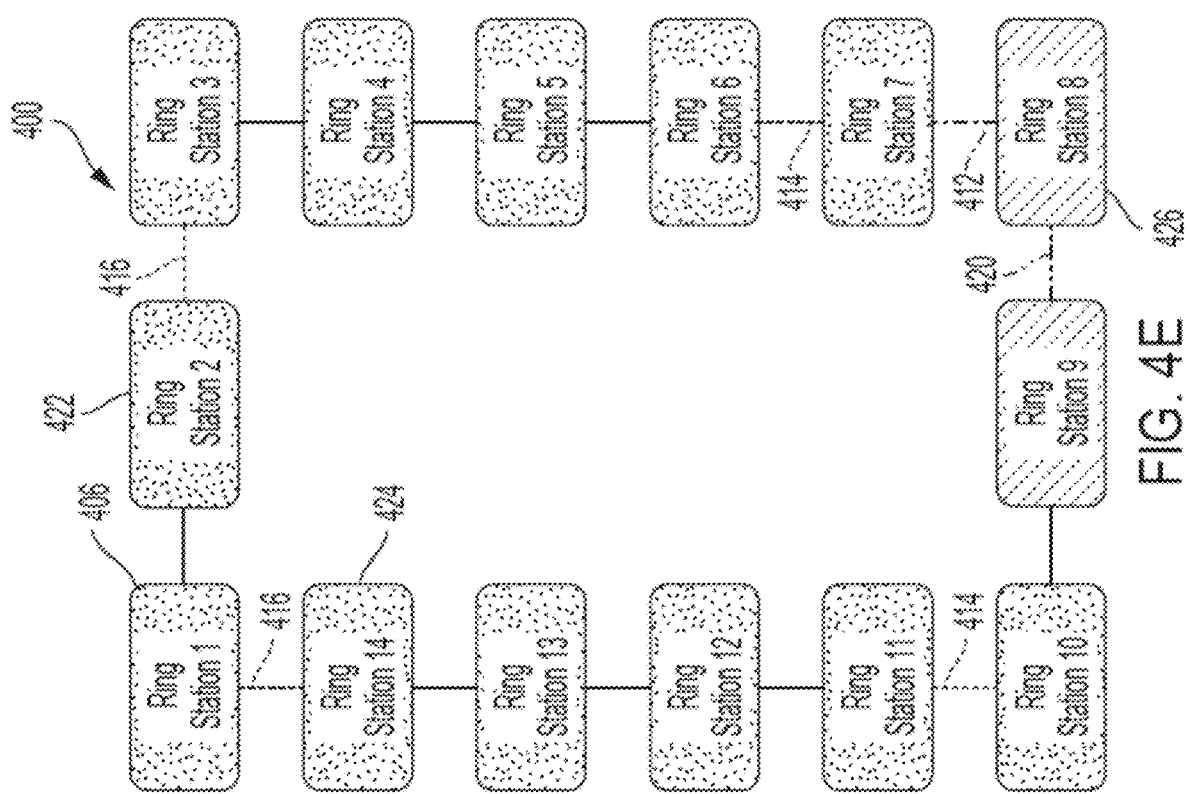
Figure 4D:
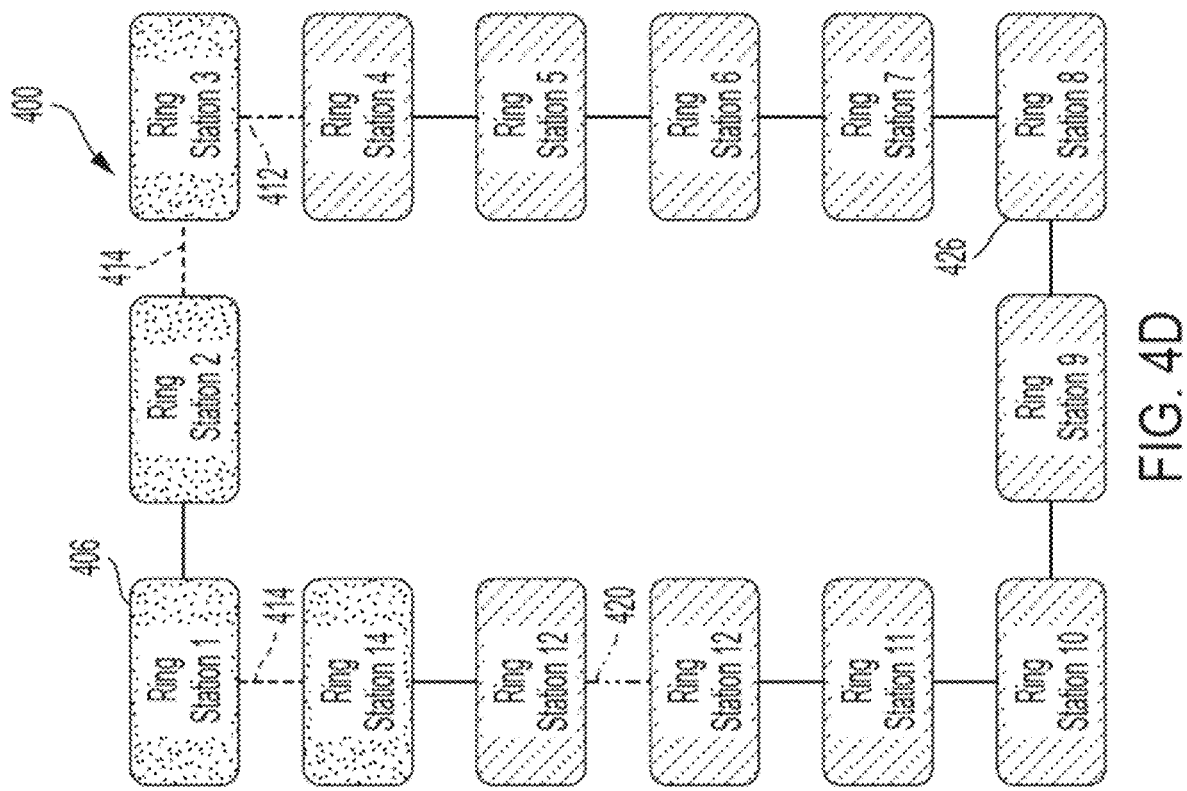

Next, as shown in FIG. 4D, two cycles after the counterclockwise warning signal 420 is transmitted, the first ring station 406 transmits a command signal 414 to the ring station 424. The counterclockwise warning signal 420 and the command signal 414 propagate around the bidirectional ring-based network 400 in the counterclockwise direction with each ring station transmitting the counterclockwise warning signal 420 and the command signal 414 to the next ring station until the diagonal ring station 426 is reached. Upon receiving the command signal 414, each ring station will process the command and determine its response to the command.

Figure 4G:
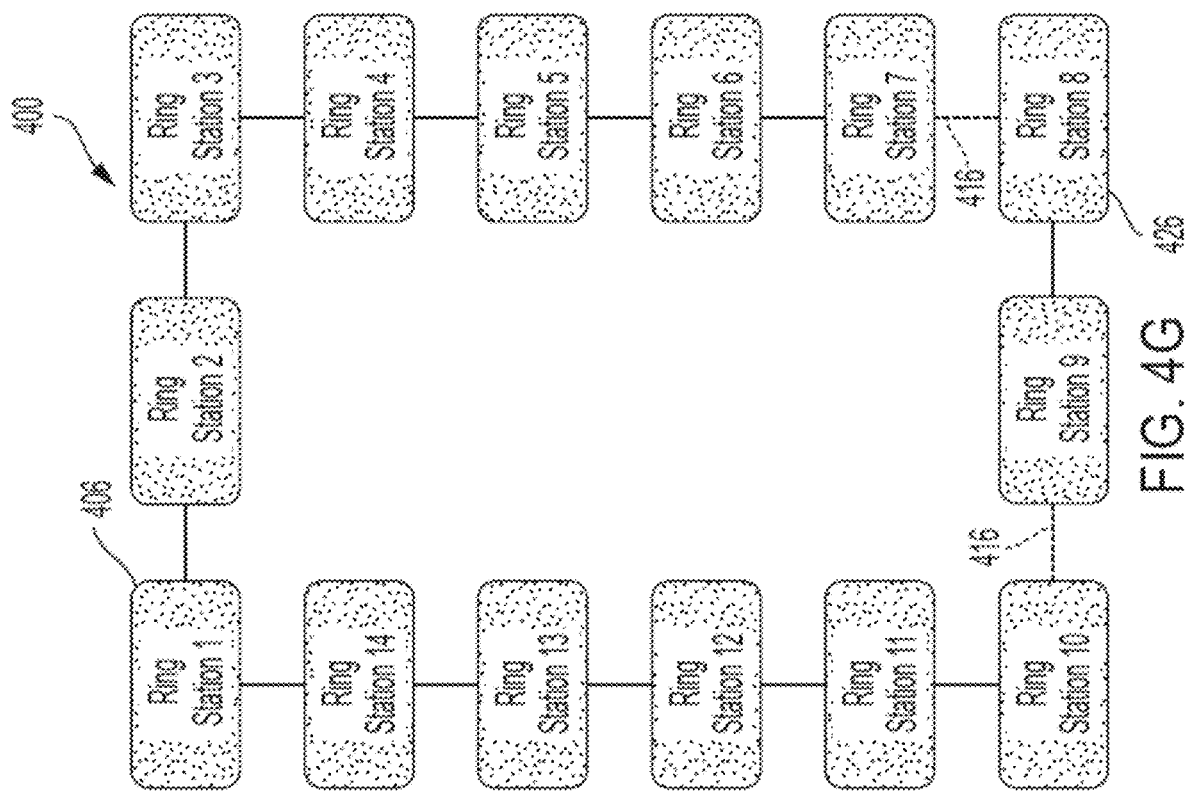
Figure 4F:
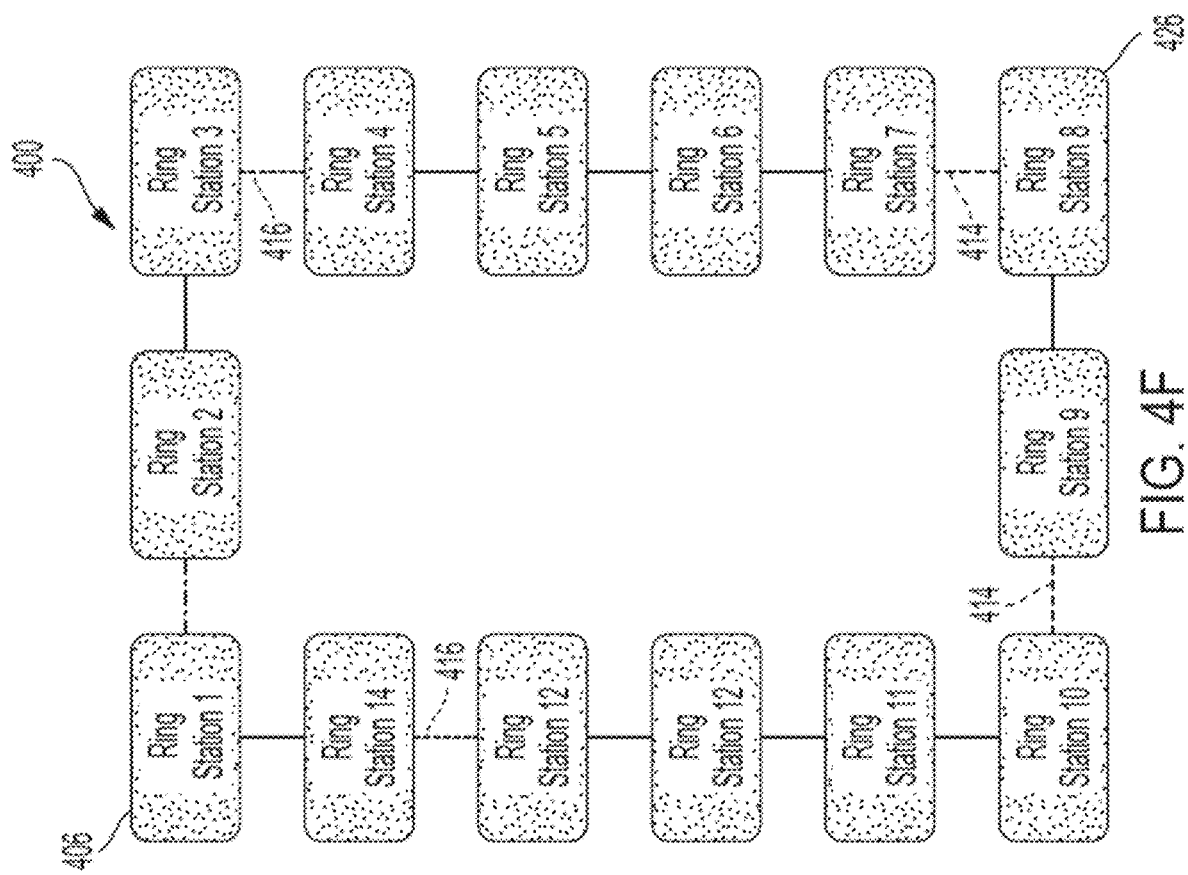

As shown in FIGS. 4E and 4F, the ring stations transmit a partial response signal 416 to the command signal 414 to the next ring station, in their respective direction, a number of cycles after the command signal 414. In exemplary embodiments, each ring station is configured to receive a partial response signal 416 from an adjacent ring station, add its response to the partial response signal and transmit an accumulated partial response signal 416 to the next ring station until the partial response signals 416 reach the diagonal ring station as shown in FIG. 4G.

Figure 4I:
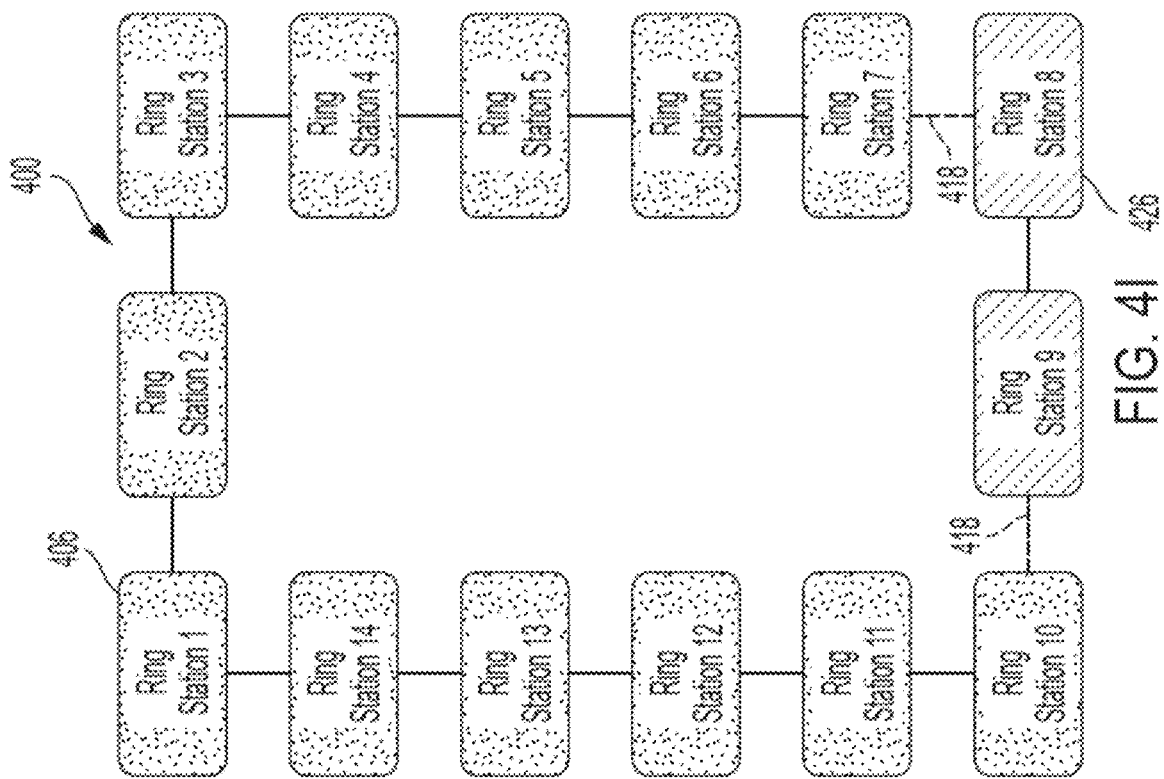
Figure 4H:
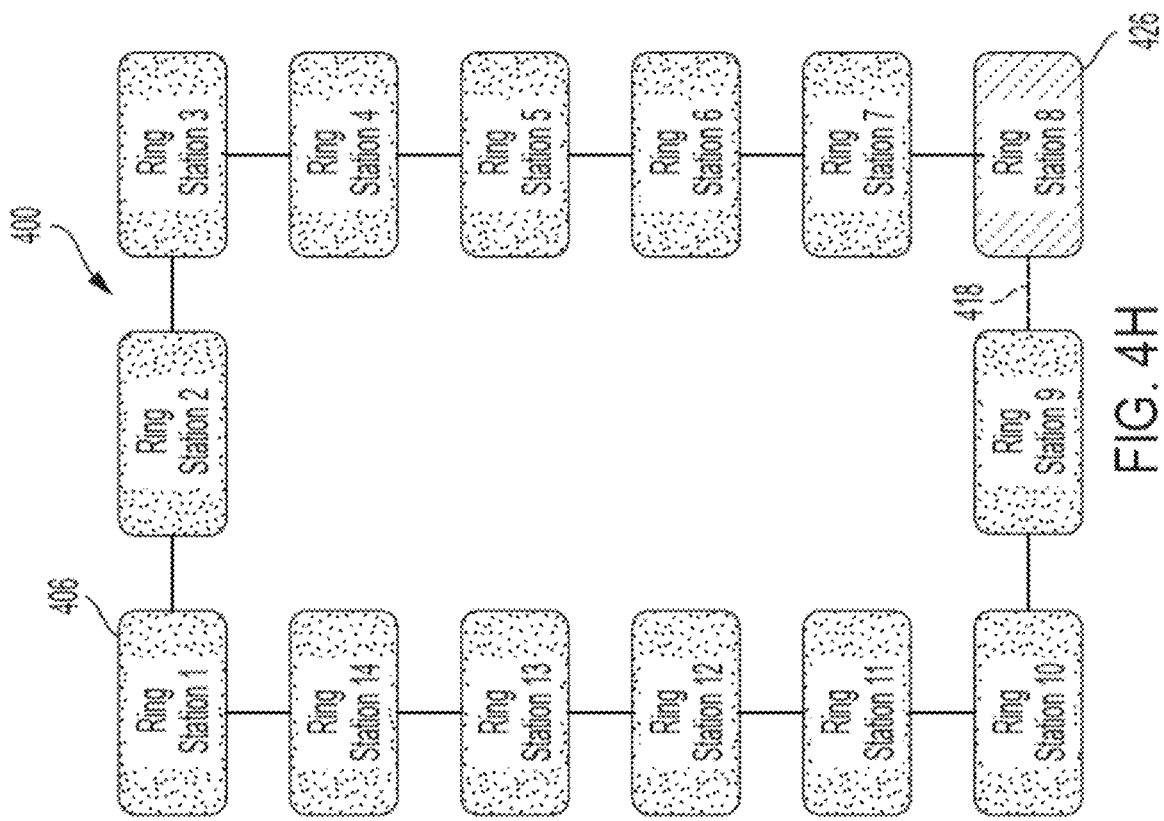
Figure 4J:
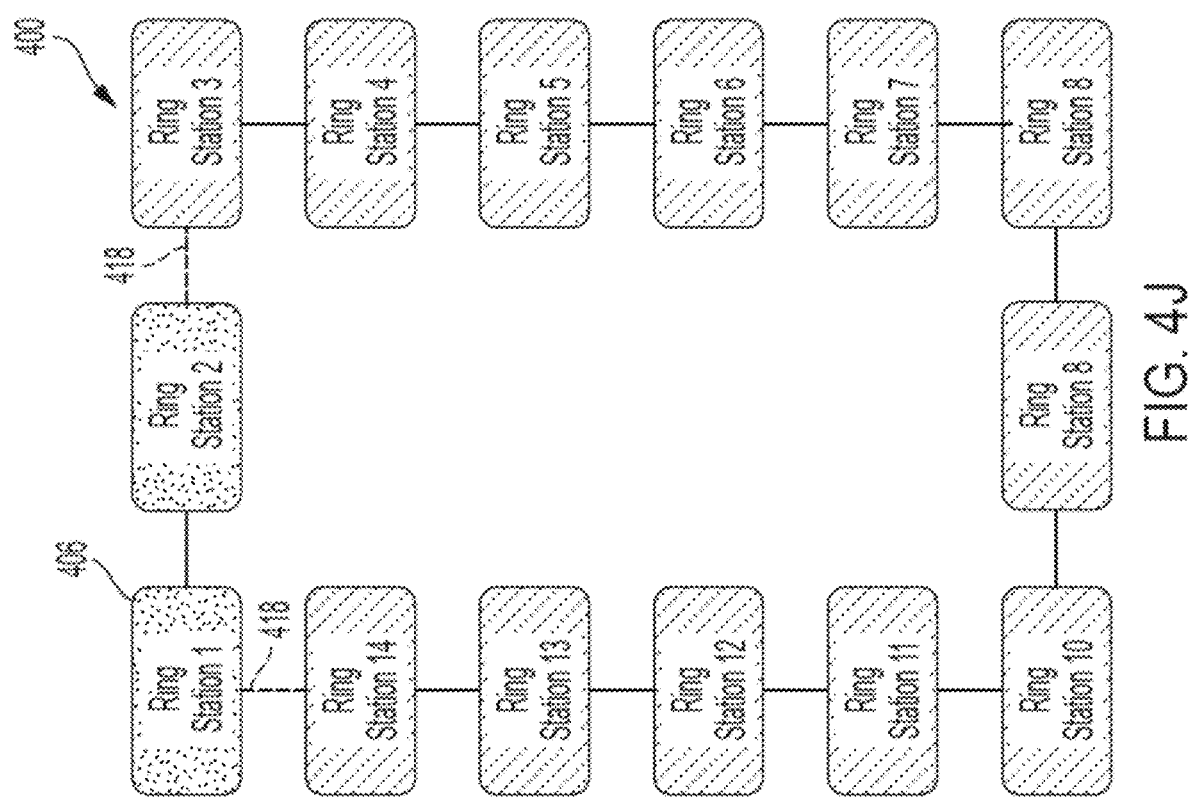

As best shown in FIG. 4H, the diagonal ring station 426 is configured to combine both partial response signals 416 and to create a complete response signal 418 that is transmitted in the clockwise direction. In the cycle after the diagonal ring station 426 transmits the complete response signal 418 in the clockwise direction, the diagonal ring station 426 transmits the complete response signal 418 in the counterclockwise direction, as shown in FIG. 4I. The complete response signals 418 propagate around the bidirectional ring-based network 400 in both the clockwise and counterclockwise direction until the first ring station 406 is reached. When a ring station transmits or terminates the complete response signal 418, the ring station has completed its execution of the command.

In exemplary embodiments, executing a command using a unidirectional network will require at least twice the number of clock cycles are there are nodes in the ring-based network. In contrast, executing a similar command in a bidirectional network will require approximately the number of clock cycles are there are nodes in the ring-based network, i.e., execution of commands via a bidirectional network are almost twice as fast as using a unidirectional network.

In exemplary embodiments, because bidirectional execution of commands taking half the time to complete the completed response signal that follows the command signal will collide exactly when a bidirectional command starts on the cycle a unidirectional command ends on the starting station, which is prevented using a bidirectional execution lock. Each ring station is configured to record the time a unidirectional or bidirectional command passes through the setting of a shift register. Since the time a unidirectional command requires the use of the combined response bus is fixed, each ring station calculates when the combined response bus would be needed in the future for a particular direction by a bidirectional command and blocks the insertion onto the ring network of the new command during cycles the ring station knows the combined responses for a unidirectional command will collide in the future.

In exemplary embodiments, ring stations are configured to be able to initiate both bidirectional and unidirectional execution of commands using the bidirectional ring network. In one embodiment, the determination of whether to use a bidirectional or a unidirectional execution of a particular command is based on a type of command. In one embodiment, some types of commands are always executed unidirectionally. In another embodiment, the determination of whether to use a bidirectional or a unidirectional execution of a particular command is based on a traffic level, or congestion, of the bidirectional ring network. In one embodiment, a configurable threshold congestion level is used to determine whether to use a bidirectional or a unidirectional execution of a particular command. For example, when the congestion on the bidirectional ring network is above a threshold level, commands will be executed in a unidirectional manner and when the congestion on the bidirectional ring network is below the threshold level, commands will be executed in a bidirectional manner.

Figure 5:
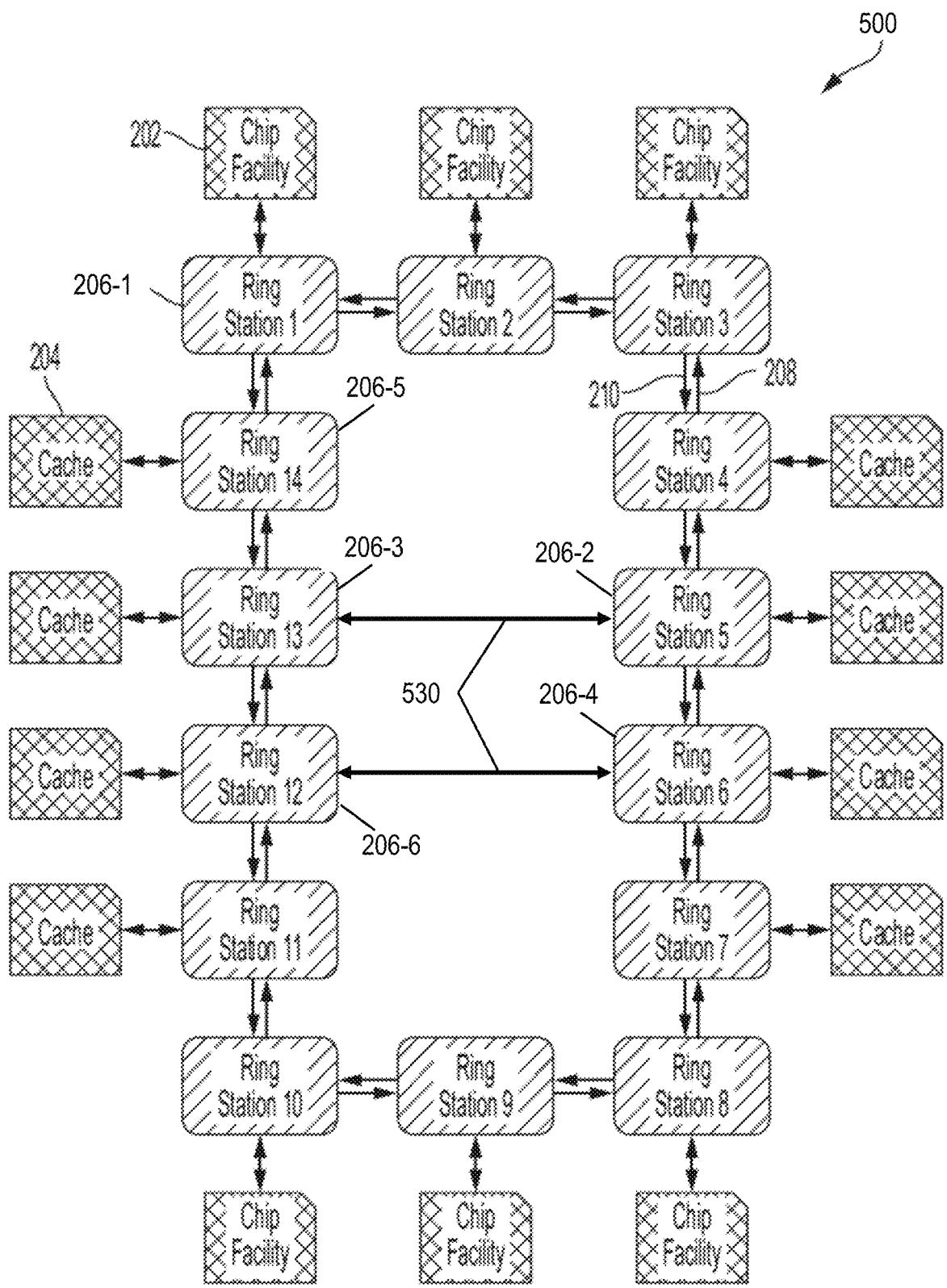
FIG. 5 is a block diagram of a multiprocessor having bidirectional ring-based networks and one or more cross bars in accordance with one or more embodiments of the present invention.

Referring now to FIG. 5, is a block diagram of a multiprocessor 500 having bidirectional ring-based networks and one or more cross bars in accordance with one or more embodiments of the present invention is shown. As illustrated, the multiprocessor 500 includes a plurality of ring stations, 206-1, 206-2, 206-3, 206-4, 206-5, 206-6, referred to collectively herein as ring stations 206 that are each associated with a node in the multiprocessor 500. The nodes include chip facilities, or processing cores, 202 and shared memories, or caches 204. Each of the ring stations 206 is connected to the two adjacent ring stations 206 via one of a clockwise ring network 210 and a counterclockwise ring network 208. Each ring station 206 is configured to send and receive messages to and from each adjacent ring station 206. In exemplary embodiments, each ring station 206 is configured to be able to place a command, such as a snoop request, onto one or more of the clockwise ring network 210 and the counterclockwise ring network 208. In exemplary embodiments, once a snoop request has been entered into a ring network it will not be halted as it flows around the ring network.

In addition, one or more of the ring stations 206 are connected to a non-adjacent ring station via a cross bar 530. For example, ring station 5, also referred to herein as second ring station 206-2, is connected to ring station 13, also referred to herein as third ring station 206-3, via a cross bar 530. In exemplary embodiments, the time that it takes for the second ring station 206-2 to transmit a command to the third ring station 206-3, may be equal to or greater than the time it takes for the second ring station 206-2 to transmit a command to an adjacent ring station, such as ring station 6, also referred to herein as fourth ring station 206-4. Although only two cross bars 530 are illustrated in the multiprocessor 500, it will be clear to those of ordinary skill in the art that any number or configuration of cross bars 530 may be provided. For example, a third cross bar may be provided between ring station 2 and ring station 9.

In exemplary embodiments, the second ring station 206-2 is configured to calculate a first estimated time of arrival of a command that the second ring station 206-2 will transmit to the third ring station 206-3 via the cross bar 530 and a second estimated time of arrival of a command that second ring station 206-2 via one or more of a clockwise ring network 210 and a counterclockwise ring network 208. In exemplary embodiments, a ring station connected to another ring station via a cross bar is only configured to transmit a command via the cross bar when the ring statin determines that the first estimated time of arrival is before the second estimated time of arrival.

In exemplary embodiments, ring stations that receive commands via a cross bar are configured to selectively re-transmit or broadcast the received commands to adjacent ring stations via one of a clockwise ring network 210 and a counterclockwise ring network 208. In exemplary embodiments, the determination of whether to selectively re-transmit or broadcast the received commands is based on information contained in a header of the received command. In exemplary embodiments, when a first ring station places a command onto one or more of the clockwise ring network 210 and the counterclockwise ring network 208 the first ring station sets a rebroadcast flag in the header of the command based on the congestion level in the clockwise ring network 210 and/or the counterclockwise ring network 208. For example, if the congestion level in the clockwise ring network 210 and/or a counterclockwise ring network 208 is above a threshold level, the first ring station sets the rebroadcast flag to a value of 0, which indicates that the command should not be rebroadcast by ring stations that receive the command via a cross bar. Alternatively, if the congestion level in the clockwise ring network 210 and/or the counterclockwise ring network 208 is below the threshold level, the first ring station sets the rebroadcast flag to a value of 1, which indicates that the command should be rebroadcast by ring stations that receive the command via a cross bar.

In exemplary embodiments, ring stations 206 that are connected to a cross bar 530 are configured to give preference to the traffic received from the clockwise ring network 210 and/or the counterclockwise ring network 208 over traffic received from the cross bar 530. For example, in a given clock cycle the third ring station 206-3 may receive commands via the cross bar 530 from the second ring station 206-2 and from one or more of the fifth ring station 206-5 and the sixth ring station 206-6 via the clockwise ring network 210 and the counterclockwise ring network 208. During this clock cycle, the third ring station 206-3 will process the commands received from either the fifth ring station 206-5 or the sixth ring station 206-6 and will place the command received from the second ring station 206-2, in a local cache or queue for processing during an open clock cycle. In exemplary embodiments, the second ring station 206-2 is further configured to discard commands in the queue that are duplicates of commands that the second ring station 206-2 has previously received via one of the clockwise ring network 210 and the counterclockwise ring network 208.

In exemplary embodiments, the second ring station 206-2 is configured to present the command to the cache/facility, collect an accompanying response, and re-align that response to the original ring flow of the message response bus based upon which crossbar it was sent over. In one embodiment, any station that has received a command that was sent over a cross bar is configured to mask the original message flowing around the ring from being presented to avoid duplicate commands to the cache or chip facility using a similar calculation. This provides a seamless and transparent operation to the chip caches and facilities, hiding that complexity within the ring structure.

Figure 6:
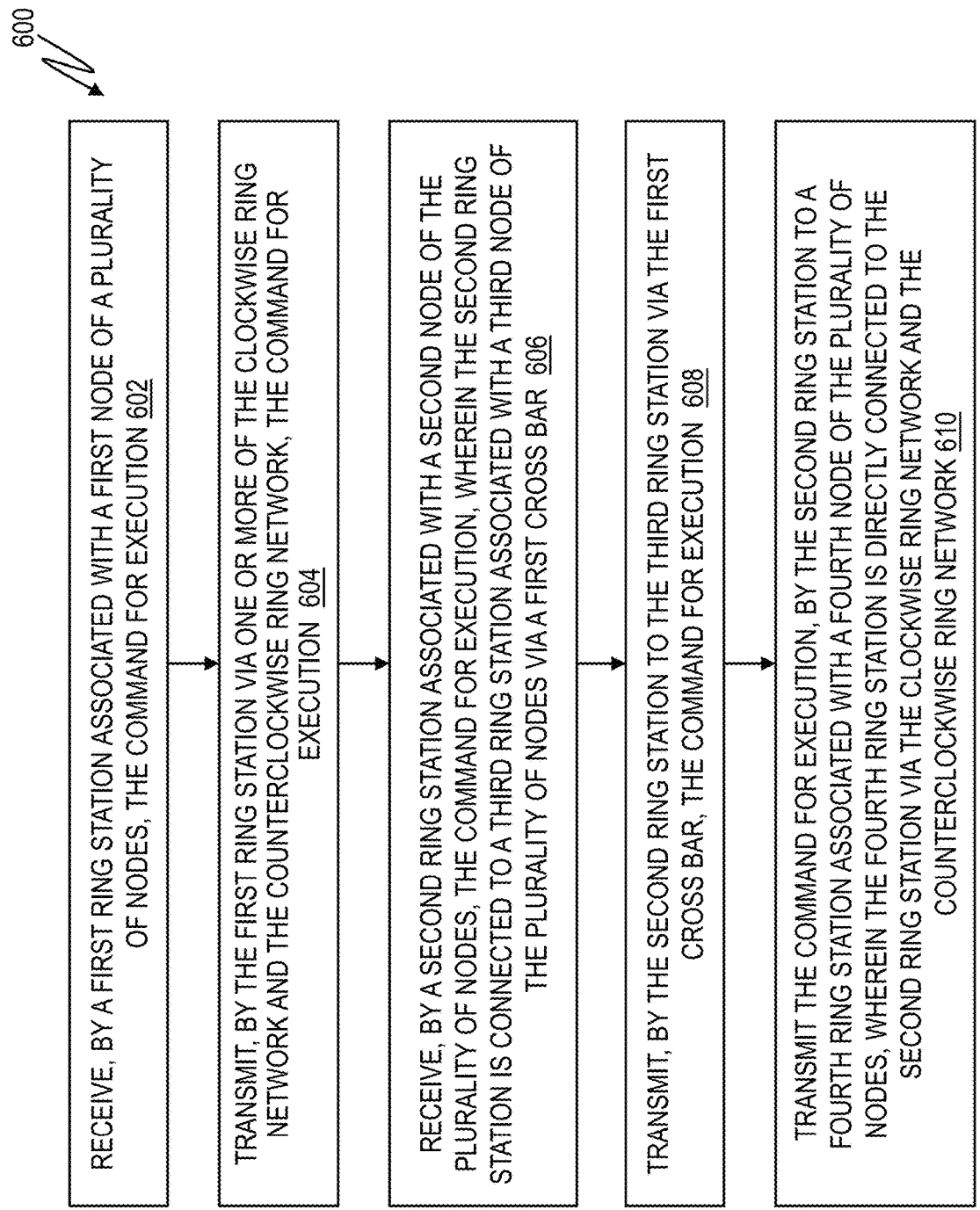
FIG. 6 is a flowchart of a method for processing a command on multiprocessor chip having a plurality of nodes that are interconnected via a clockwise ring network, a counterclockwise ring network, and one or more cross bars in accordance with one or more embodiments of the present invention.

Referring now to FIG. 6, a flowchart of a method 600 for processing a command on multiprocessor chip having a plurality of nodes that are interconnected via a clockwise ring network, a counterclockwise ring network, and one or more cross bars in accordance with one or more embodiments of the present invention is shown. The method 600 includes receiving, by a first ring station 206-1 associated with a first node of the plurality of nodes, the command for execution. Next, as shown at block 604 the method 600 includes transmitting, by the first ring station 206-1 via one or more of the clockwise ring network 210 and the counterclockwise ring network 208, the command for execution.

Next, as shown at block 606, the method 600 includes receiving, by a second ring station 206-2 associated with a second node of the plurality of nodes, the command for execution, wherein the second ring station 206-2 is connected to a third ring station 206-3 associated with a third node of the plurality of nodes via a first cross bar 530. In exemplary embodiments, the second ring station 206-2 is configured to calculate a first expected time that the command for execution will reach the third ring station 206-3 via the first cross bar and a second expected time that the command for execution will reach the third ring station 206-3 via the one or more of the clockwise ring network 210 and the counterclockwise ring network 208. The method 600 also includes transmitting, by the second ring station 206-2 to the third ring station 206-3 via the first cross bar 530, the command for execution, as shown at block 608. In exemplary embodiments, a determination to transmit the command for execution, by the second ring station 206-2 to the third ring station 206-3 via the first cross bar 530, is based on first expected time being before the second expected time.

In exemplary embodiments, the initial command may be received by the second ring station 206-2 and the second ring station 206-2 is configured to transmit the command to the third ring station 206-3 via the first cross bar 530 and to adjacent ring stations 206 via one or more of the clockwise ring network 210 and the counterclockwise ring network 208, (i.e., in some cases the functions described for the first-ring station 206-1 and the second ring station 206-2 may be performed by a single ring station).

In exemplary embodiments, each ring station 206 has information regarding the topology of the clockwise ring network 210 and the counterclockwise ring network 208 and is capable of calculating an estimated time of arrival of a command that it will transmit via the clockwise ring network 210 and the counterclockwise ring network 208 to another ring station 206. Likewise, ring stations that are connected to a cross bar 530 are capable of calculating an estimated time of arrival of a command that it will transmit via the cross bar. In exemplary embodiments, a header of command includes information including the start station, i.e., which ring station initiated the command, whether the command has been transmitted via a crossbar was used, and any time that the command was delayed using the crossbar or at the receiving station.

In exemplary embodiments, the third ring station 206-3 is selectively configured to transmit the command for execution, received via the first cross bar, on one or more of the clockwise ring network 210 and the counterclockwise ring network 208 based on a congestion level of the one or more of the clockwise ring network 210 and the counterclockwise ring network 208. In one embodiment, the congestion level of the one or more of the clockwise ring network 210 and the counterclockwise ring network 208 is determined by the first ring station 206-1, e.g., the ring station that initially places the command onto the ring network, and is indicated in a header of the command for execution.

In exemplary embodiments, ring stations 206 that are connected to a cross bar 530 are configured to give preference to the traffic received from the clockwise ring network 210 and/or the counterclockwise ring network 208 over traffic received from the cross bar 530. For example, the third ring station 206-3 is configured to store the command for execution in a cache and to present the command for execution to the third node during a clock cycle in which the third ring station did not receive a command via the one or more of the clockwise ring network 210 and the counterclockwise ring network 208.

In exemplary embodiments, the third ring station 206-3 is configured to prevent the command for execution received via the one or more of the clockwise ring network 210 and the counterclockwise ring network 208 from being presented to the third node based on a determination that the command for execution received via the first cross bar 530 has been previously presented to the third node. In addition, each ring station that receives a command that has traversed a cross bar is configured to collect and stage partial responses to the command and to re-align the partial responses with the original partial response flow being transmitted around the one or more of the clockwise ring network 210 and the counterclockwise ring network 208

Next, as shown at block 610, the method 600 includes transmitting the command for execution, by the second ring station 206-2 to a fourth ring station 206-4 associated with a fourth node of the plurality of nodes, wherein the fourth ring station 206-4 is directly connected to the second ring station via the clockwise ring network 210 and the counterclockwise ring network 208.

In exemplary embodiments, technical effects and benefits of the methods, systems, and computer program products for processing a command on multiprocessor chip having a plurality of nodes that are interconnected via a clockwise ring network, a counterclockwise ring network, and one or more cross bars include reducing a time required to perform the command. In exemplary embodiments, utilizing one or more cross bars to connect opposite sides of the ring network allows commands to reach all observers on the ring in a faster amount of time than it would take a command to flow around the ring structure normally. This savings in time allows the associated cache directory lookup to happen sooner, speeding up the data return path and therefore increasing cache performance.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of processing a command on a multiprocessor chip having a plurality of nodes that are interconnected via a clockwise ring network, a counterclockwise ring network, and one or more cross bars, the method comprising:
receiving, by a first ring station associated with a first node of the plurality of nodes, the command for execution;
transmitting, by the first ring station via one or more of the clockwise ring network and the counterclockwise ring network, the command for execution;
receiving, by a second ring station associated with a second node of the plurality of nodes, the command for execution, wherein the second ring station is connected to a third ring station associated with a third node of the plurality of nodes via a first cross bar of the one or more cross bars;
transmitting, by the second ring station to the third ring station via the first cross bar, the command for execution; and
transmitting the command for execution, by the second ring station to a fourth ring station associated with a fourth node of the plurality of nodes, wherein the fourth ring station is directly connected to the second ring station via one of the clockwise ring network and the counterclockwise ring network.

2. The method of claim 1, wherein the third ring station is selectively configured to transmit the command for execution, received via the first cross bar, on one or more of the clockwise ring network and the counterclockwise ring network based on a congestion level of the one or more of the clockwise ring network and the counterclockwise ring network.

3. The method of claim 2, wherein the congestion level of the one or more of the clockwise ring network and the counterclockwise ring network is determined by the first ring station and indicated in a header of the command for execution.

4. The method of claim 1, wherein the second ring station is configured to calculate a first expected time that the command for execution will reach the third ring station via the first cross bar and a second expected time that the command for execution will reach the third ring station via the one or more of the clockwise ring network and the counterclockwise ring network.

5. The method of claim 4, wherein a determination to transmit the command for execution, by the second ring station to the third ring station via the first cross bar, is based on first expected time being before the second expected time.

6. The method of claim 1, wherein the third ring station is configured to store the command for execution in a cache and to present the command for execution to the third node during a clock cycle in which the third ring station did not receive a command via the one or more of the clockwise ring network and the counterclockwise ring network.

7. The method of claim 1, wherein the third ring station is configured to prevent the command for execution received via the one or more of the clockwise ring network and the counterclockwise ring network from being presented to the third node based on a determination that the command for execution received via the first cross bar has been previously presented to the third node.

8. A multiprocessor chip comprising:
   a plurality of nodes;
   a plurality of ring stations, which are each associated with one of the plurality of node, that are interconnected via a clockwise ring network, a counterclockwise ring network, and one or more cross bars,
   wherein a first ring station associated with a first node of the plurality of nodes is configured to:
      receive a command for execution; and
      transmit, via one or more of the clockwise ring network and the counterclockwise ring network, the command for execution;
   wherein a second ring station associated with a second node of the plurality of nodes is configured to:
      receive the command for execution via the one or more of the clockwise ring network and the counterclockwise ring network;
      transmit the command for execution to a third ring station associated with a third node of the plurality of nodes via a first cross bar of the one or more cross bars, wherein the first cross bar connects the third ring station to the second ring station; and
      transmit the command for execution to a fourth ring station associated with a fourth node of the plurality of nodes, wherein the fourth ring station is directly connected to the second ring station via one of the clockwise ring network and the counterclockwise ring network.

9. The multiprocessor chip of claim 8, wherein the third ring station is selectively configured to transmit the command for execution, received via the first cross bar, on one or more of the clockwise ring network and the counterclockwise ring network based on a congestion level of the one or more of the clockwise ring network and the counterclockwise ring network.

10. The multiprocessor chip of claim 9, wherein the congestion level of the one or more of the clockwise ring network and the counterclockwise ring network is determined by the first ring station and indicated in a header of the command for execution.

11. The multiprocessor chip of claim 8, wherein the second ring station is configured to calculate a first expected time that the command for execution will reach the third ring station via the first cross bar and a second expected time that the command for execution will reach the third ring station via the one or more of the clockwise ring network and the counterclockwise ring network.

12. The multiprocessor chip of claim 11, wherein a determination to transmit the command for execution, by the second ring station to the third ring station via the first cross bar, is based on first expected time being before the second expected time.

13. The multiprocessor chip of claim 8, wherein the third ring station is configured to store the command for execution in a cache and to present the command for execution to the third node during a clock cycle in which the third ring station did not receive a command via the one or more of the clockwise ring network and the counterclockwise ring network.

14. The multiprocessor chip of claim 8, wherein the third ring station is configured to prevent the command for execution received via the one or more of the clockwise ring network and the counterclockwise ring network from being presented to the third node based on a determination that the command for execution received via the first cross bar has been previously presented to the third node.

15. A system comprising:
   a memory having computer readable instructions; and
   a multiprocessor chip for executing the computer readable instructions, the multiprocessor chip comprising:
      a plurality of nodes;
      a plurality of ring stations, which are each associated with one of the plurality of node, that are interconnected via a clockwise ring network, a counterclockwise ring network and one or more cross bars,
      wherein a first ring station associated with a first node of the plurality of nodes is configured to:
         receive a command for execution; and
         transmit, via one or more of the clockwise ring network and the counterclockwise ring network, the command for execution;
      wherein a second ring station associated with a second node of the plurality of nodes is configured to:
         receive the command for execution via the one or more of the clockwise ring network and the counterclockwise ring network;
         transmit the command for execution to a third ring station associated with a third node of the plurality of nodes via a first cross bar of the one or more cross bars, wherein the first cross bar connects the third ring station to the second ring station; and
         transmit the command for execution to a fourth ring station associated with a fourth node of the plurality of nodes, wherein the fourth ring station is directly connected to the second ring station via one of the clockwise ring network and the counterclockwise ring network.

16. The system of claim 15, wherein the third ring station is selectively configured to transmit the command for execution, received via the first cross bar, on one or more of the clockwise ring network and the counterclockwise ring network based on a congestion level of the one or more of the clockwise ring network and the counterclockwise ring network.

17. The system of claim 16, wherein the congestion level of the one or more of the clockwise ring network and the counterclockwise ring network is determined by the first ring station and indicated in a header of the command for execution.

18. The system of claim 15, wherein the second ring station is configured to calculate a first expected time that the command for execution will reach the third ring station via the first cross bar and a second expected time that the command for execution will reach the third ring station via the one or more of the clockwise ring network and the counterclockwise ring network.

19. The system of claim 18, wherein a determination to transmit the command for execution, by the second ring station to the third ring station via the first cross bar, is based on first expected time being before the second expected time.

20. The system of claim 15, wherein the third ring station is configured to store the command for execution in a cache and to present the command for execution to the third node during a clock cycle in which the third ring station did not receive a command via the one or more of the clockwise ring network and the counterclockwise ring network.

* * * * *